(12) United States Patent
Super et al.

(10) Patent No.: US 7,983,451 B2
(45) Date of Patent: Jul. 19, 2011

(54) RECOGNITION METHOD USING HAND BIOMETRICS WITH ANTI-COUNTERFEITING

(75) Inventors: Boaz J. Super, Westchester, IL (US); James E. Crenshaw, Palatine, IL (US); Douglas A. Kuhlman, Inverness, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1058 days.

(21) Appl. No.: 11/479,793

(22) Filed: Jun. 30, 2006

(65) Prior Publication Data

US 2008/0002860 A1    Jan. 3, 2008

(51) Int. Cl.
*G06K 9/36* (2006.01)
*G05B 19/00* (2006.01)

(52) U.S. Cl. . 382/115; 382/286; 340/5.82; 348/E13.004

(58) Field of Classification Search ................ 382/115, 382/124, 119, 232, 314, 187, 312, 313, 100, 382/190, 126, 291, 276, 286; 713/186, 176, 713/193, 180; 235/380, 383, 379, 375, 382; 340/5.8, 5.81, 5.82, 5.83, 5.52, 5.53; 356/71; 348/E13.005, E13.014, E13.016, E13.018, 348/E13.025, E13.004; 705/67
See application file for complete search history.

(56) References Cited

U.S. PATENT DOCUMENTS

| | | | |
|---|---|---|---|
| 4,736,203 A | 4/1988 | Sidlauskas | |
| 5,319,747 A * | 6/1994 | Gerrissen et al. | 715/839 |
| 5,483,601 A * | 1/1996 | Faulkner | 382/115 |
| 5,610,688 A * | 3/1997 | Inamoto et al. | 399/366 |
| 5,696,594 A * | 12/1997 | Saito et al. | 358/296 |
| 6,147,678 A * | 11/2000 | Kumar et al. | 345/158 |
| 6,404,904 B1 | 6/2002 | Einighammer | |
| 6,765,470 B2 | 7/2004 | Shinzaki | |
| 6,788,809 B1 * | 9/2004 | Grzeszczuk et al. | 382/154 |
| 6,819,782 B1 * | 11/2004 | Imagawa et al. | 382/115 |
| 6,853,444 B2 | 2/2005 | Haddad | |
| 6,877,097 B2 | 4/2005 | Hamid | |
| 6,947,579 B2 | 9/2005 | Bronstein et al. | |
| 6,961,450 B2 | 11/2005 | Takhiri | |
| 7,327,858 B2 * | 2/2008 | Weiss | 382/115 |
| 7,394,918 B2 * | 7/2008 | Mihara et al. | 382/107 |
| 7,505,941 B2 | 3/2009 | Bishop et al. | |
| 7,650,014 B2 * | 1/2010 | Ikeda et al. | 382/103 |
| 2003/0095708 A1 | 5/2003 | Pittel | |
| 2003/0123713 A1 | 7/2003 | Geng | |
| 2003/0133596 A1 | 7/2003 | Brooks | |

(Continued)

OTHER PUBLICATIONS

Turk, Matthew, Computer Vision in the Interface, Communication of the ACM, vol. 47, No. 1, Jan. 2004, pp. 62-67.

(Continued)

*Primary Examiner* — Sheela C Chawan
(74) *Attorney, Agent, or Firm* — Hisashi D. Watanabe; Ingrassia Fisher & Lorenz

(57) ABSTRACT

A method is provided for identifying and verifying a person using hand biometrics with an anti-spoofing measure. The method comprises acquiring (51) a first image (10) of a hand in a first configuration, acquiring (52) a second image (30, 40) of the hand in one of the first and a second configuration for comparison with the first image (10), determining (52) whether a person can be identified from at least one of the first image (10) and the second image (30, 40), and determining (55) from a comparison of the second image (30, 40) with the first image (10) whether the hand is a counterfeit.

11 Claims, 4 Drawing Sheets

U.S. PATENT DOCUMENTS

| | | |
|---|---|---|
| 2004/0076313 A1 | 4/2004 | Bronstein et al. |
| 2004/0151346 A1 | 8/2004 | Weiss |
| 2005/0008197 A1 | 1/2005 | Dennis |
| 2005/0038741 A1 | 2/2005 | Bonalle |
| 2005/0043014 A1 | 2/2005 | Hodge |
| 2005/0053264 A1 | 3/2005 | Amano |
| 2005/0074174 A1 | 4/2005 | Ishikawa |
| 2005/0187883 A1 | 8/2005 | Bishop |
| 2006/0078170 A1* | 4/2006 | Kamata et al. ............... 382/115 |
| 2006/0280333 A1* | 12/2006 | Ikeda et al. ................... 382/103 |
| 2006/0280367 A1* | 12/2006 | Kuwabara et al. ............ 382/181 |

OTHER PUBLICATIONS

PCT Notification of Transmittal of the International Search Report and the Written Opinion of the International Searching Authority, or the Declaration, Feb. 14, 2008, pp. 1-7, PCT/US2007/64856, Commissioner for Patents, Alexandria, Virginia, USA.

* cited by examiner

50

RECOGNITION METHOD USING HAND BIOMETRICS WITH ANTI-COUNTERFEITING

FIELD OF THE INVENTION

The present invention generally relates to verifying the identity of a person, and more particularly to a method for identifying and verifying a person using hand biometrics.

BACKGROUND OF THE INVENTION

Transactions of many types require a system for identifying a person (Who is it?) or for verifying a person's claimed identity (Is she who she says she is?). The term recognition refers to identification and verification collectively. Traditionally, three methods have been used for recognizing a person: passwords, tokens, and biometrics.

Biometrics refers to information measured from a person's body or behavior. Examples of biometrics include fingerprints, hand shapes, palm prints, footprints, retinal scans, iris scans, face images, ear shapes, voiceprints, gait measurements, keystroke patterns, and signature dynamics. The advantages of pure biometric recognition are that there are no passwords to forget or to give out, and no cards (tokens) to lose or lend.

In biometric verification, a user presents a biometric which is compared to a stored biometric corresponding to the identity claimed by the user. If the presented and stored biometrics are sufficiently similar, then the user's identity is verified. Otherwise, the user's identity is not verified.

In biometric identification, the user presents a biometric which is compared with a database of stored biometrics typically corresponding to multiple persons. The closest match or matches are reported. Biometric identification is used for convenience, e.g., so that users would not have to take time consuming actions or carry tokens to identify themselves, and also for involuntary identification, e.g., when criminal investigators identify suspects by matching fingerprints.

A problem faced by biometric recognition systems is the use of counterfeit biometrics to defeat the protections afforded by such systems. The use of counterfeits by unauthorized persons in order to fool the system into providing them access to which they would not otherwise be entitled is also called spoofing. One example is the presentation of a photograph, such as of a fingerprint, hand, or face, to spoof the biometric system. Another example is the presentation of a three-dimensional (3D) fake, such as a rubber hand or a gel finger. Another example is the presentation of a body part taken from a registered user of the biometric system.

Accordingly, it is desirable to provide a method for reducing the possibility that a biometric recognition system will be fooled by a counterfeit biometric. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A method is provided for identifying and verifying a person using hand biometrics with an anti-spoofing measure. The method comprises acquiring a first image of a hand in a first configuration, acquiring a second image of the hand in one of the first and a second configuration, determining whether a person can be identified from at least one of the first image and the second image, and determining from a comparison of the second image with the first image whether the hand is a counterfeit.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

Figure 1:
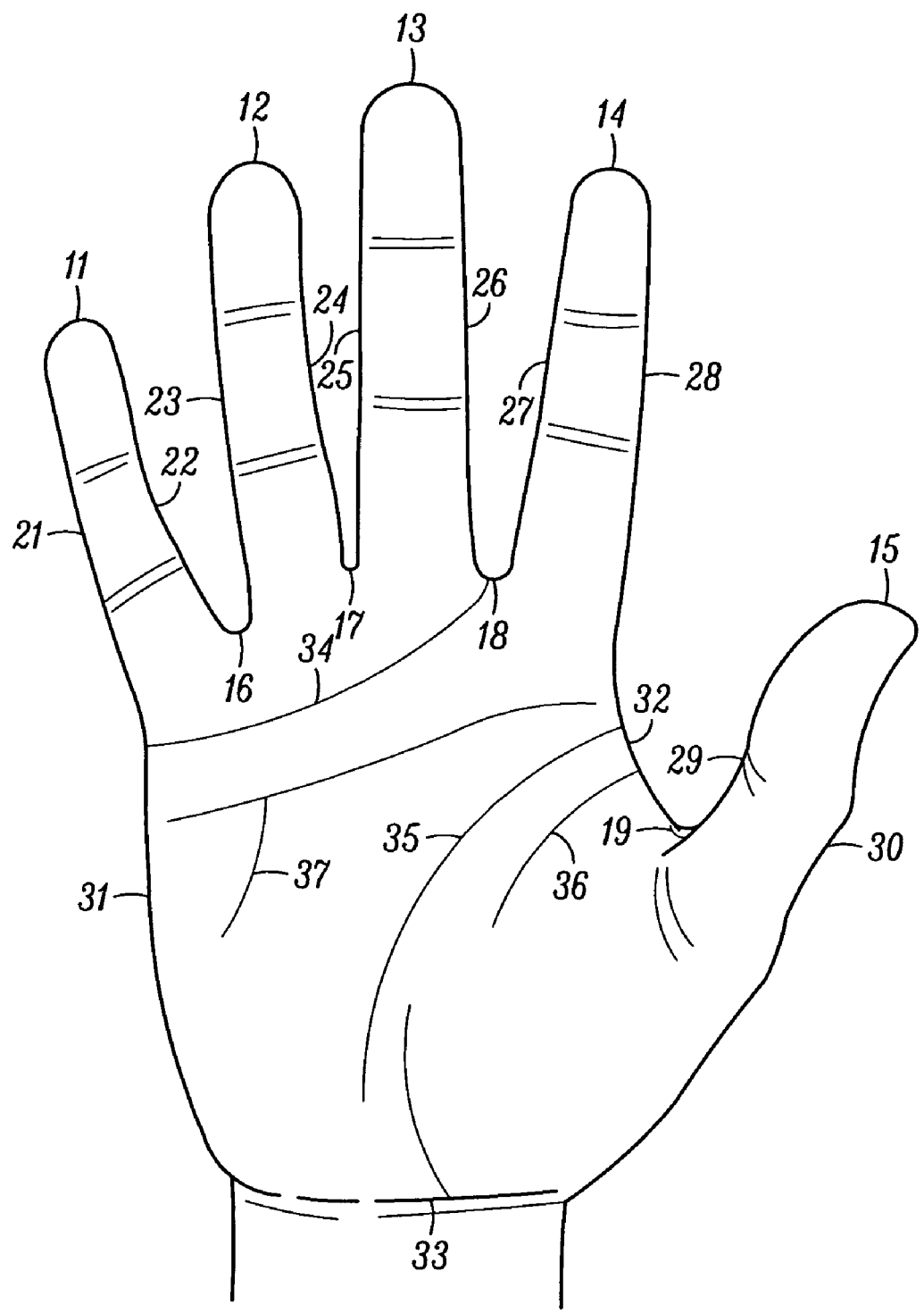
FIG. 1 is a person's hand in a first configuration illustrating reference points in accordance with an exemplary embodiment.
Figure 2:
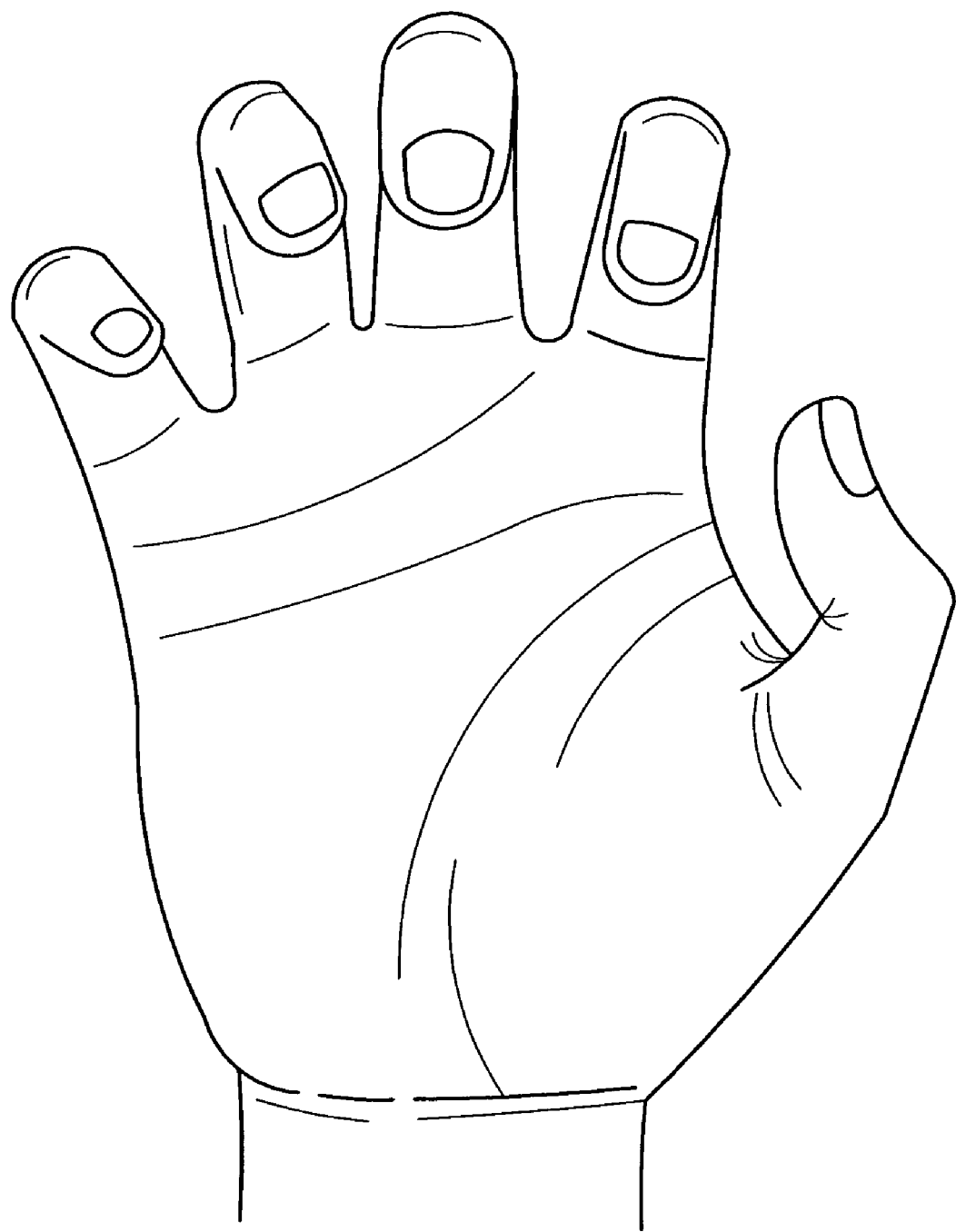
FIG. 2 is the hand of FIG. 1 in a second configuration.

The following detailed description of the invention is merely exemplary in nature and is not intended to limit the invention or the application and uses of the invention. Furthermore, there is no intention to be bound by any theory presented in the preceding background of the invention or the following detailed description of the invention.

The use of hands for biometric identification and verification provides several advantages over other biometric technologies, including: (1) hand biometrics are among the biometrics most acceptable to general users because they are convenient and because their acquisition tends to be perceived as less invasive, (2) hand geometry readers work even if hands are dirty, unlike fingerprints, and (3) special sensors will not be required if the device employing biometric recognition already has a camera with suitable focus field and resolution. Hand biometrics generally comprise measuring physical dimensions and combinations thereof, such as the ratio between finger length or width; the pattern of lines on the palm; textures; colors; and other measurable characteristics of the hand. A hand biometric refers to an image or images of a hand or hands, or parts of the hand or hands, such as two fingers or a palm; measurements that can be made from those images; representations that can be made from those images; or combinations of the images, the measurements, and the representations. Note that it is possible to use multiple biometrics in the same system. For example, a system can use hand biometrics, fingerprints, and face biometrics. It is also possible to combine biometric and non-biometric means of recognition.

A hand biometric as defined herein may comprise an image of a palm. A palm image generally comprises measuring lines in the skin of the palm, e.g., lengths or distance therebetween.

One method of implementing the exemplary embodiment includes a mobile device, e.g., a camera or a cell phone having a camera embedded therein. Another exemplary embodiment comprises a fixed-reader, or stationary platform, including a camera. A camera as used herein includes any type of imaging device.

In one exemplary embodiment of the invention, a hand biometric reader can support an anti-spoofing measure by requiring the user to reconfigure, e.g., flex or deform, the hand in order to prove that the hand is real and alive. In a second exemplary embodiment of the invention, a hand biometric reader can support an anti-spoofing measure by measuring three dimensional geometry of the hand. These embodiments provide different levels of anti-spoofing security. For example, a rotation of the hand or a three dimensional picture provide security against photographic fakes but not three dimensional fakes, whereas moving the hand from a plane to a clenched fist provides security against three dimensional fakes that cannot be deformed or flexed in a natural manner. These embodiments may be combined in a system for providing improved anti-spoofing security.

In general, one exemplary embodiment comprises recording an image of a hand or palm and then another image as the hand position is reconfigured. A reconfiguration, or modification or movement, of the hand or palm would include, for example, contracting muscles in the fingers and/or palm so to move from a plane to a more relaxed state or to a fist. The configurations of the hand can be in a different order, for example, the hand can start in a relaxed or fist state and end in a plane. The reconfiguration may also comprise a simple rotation of the hand, e.g., where the little finger remains in the original plane and the thumb is moved out of the plane as the hand stays flat. A number of digital images, but at least 2, may be recorded and compared. In a preferred embodiment, the images are frames from a video stream captured by the camera.

Another exemplary embodiment comprises recording a single three dimensional image of a hand or palm. This could be accomplished with two or more sensors or with a laser scanner, for example, using three dimensional reconstruction algorithms known in the art. It could also be accomplished from a series of images, for example, a series of video frames, using three dimensional reconstruction algorithms known in the art.

Regardless of which of these embodiments, or another embodiment, is utilized, geometric measurements of the hand or palm are made from the image or images, and compared with stored measurements of a person or persons. Values are assigned to the measurement comparisons. If the values are within a threshold, and if a determination is made that the hand is real, the identity of the person is verified.

Referring to FIGS. 1-5, a method will be described for identifying and verifying a person in accordance with exemplary embodiments, in which pictures are taken (images are stored) of a hand or palm from either a fixed-reader (stationary platform) or a mobile device (camera). It is appreciated that the embodiments will work with any camera or scanning unit that may capture an image. As used herein, the words "capture", "record", "store" are meant to be used generically and interchangeably and mean that an image is electronically captured.

In a first exemplary embodiment, a first image of a hand 10 as shown in FIG. 1 is taken. The first image is binarized and image correaction may be performed. Binarization may include, for example, setting pixels that code color values typical for skin to a value of 1, and setting pixels that code color values not typical for skin to a value of 0. Image correaction may include, for example, filtering out noise. The binarized first image is converted into chain codes in a manner known to those skilled in the art. Alternatively, a statistical model of the shape and appearance of the hand may be fitted to the first image and assignments made to reference points. Assignments are made, for example, for reference points 11, 12, 13, 14, 15 at the tip of each finger, reference points 16, 17, 18, 19 at the base of the web between each finger, reference points 21, 22, 23, 24, 25, 26, 27, 28, 29, 30 at the midpoint of the side of each finger, and reference points 31, 32, 33, 34, 35, 36, 37 at midpoints or endpoints of lines in the palm. It is appreciated fewer points, or many more points, may be assigned. Distances between selected points are measured. For example, the distance from the point 14 (the tip of the index finger) to the point 18 (the web between the index finger and the middle finger) is determined. Another example would comprise measuring the width of a finger, e.g., between points 27 and 28. Yet another example would comprise the distance between points 35 and 36 (lines in the palm). Distances between a plurality of points are preferably determined. Combinations of distances, such as ratios or logical comparisons, may be also be determined. These distances, combinations, or both are then compared with stored distances, combinations, or both from previously stored images. The comparison may be carried out using any method of comparing quantities or sets of quantities, e.g., by summing squared differences. Values are assigned based on the comparison, and a determination is made whether the values are within a threshold. If the values are within a threshold, the identity of the person whose hand is being scanned is verified or a subset of persons in the database with similar biometric measurements are reported.

Figure 3:
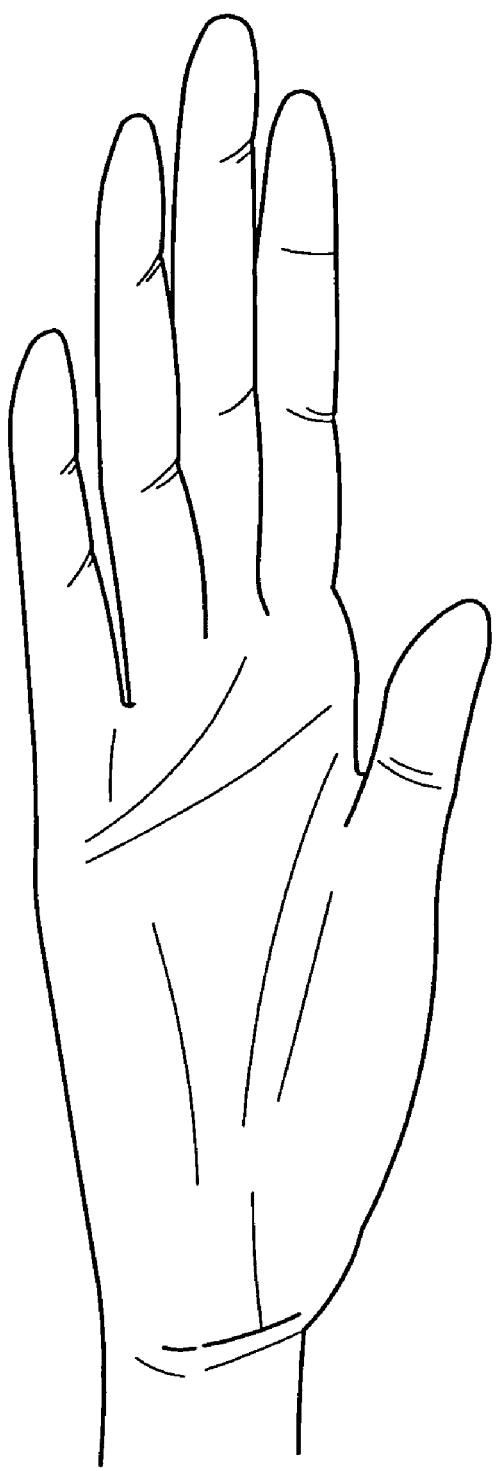
FIG. 3 is the hand of FIG. 1 in a third configuration.

The hand is then reconfigured, such as clenching the hand 40 into a fist (FIG. 2) or rotating the hand 50 upon its side (FIG. 3). Rotating on its side means rotation of the hand, e.g., where the little finger remains in the original plane and the thumb is moved out of the plane as the hand stays flat. One or more pictures are taken of the hand being reconfigured and a determination is made that the hand is real. For example, in the case in which pixels code color values, the shape of the region of skin pixels may be measured in each frame using methods known in the art, and the presence of a deformation of this region across frames is used to determine that the hand is real. Additional protection against spoofing can be obtained by verifying that a sufficiently large region of skin pixels exists in every frame. If the frames are sufficiently close together in time, as in e.g., typical video frame rates of 15 or 30 frames per second, then it is difficult for an unauthorized person to show a picture of a hand in the first configuration and then substitute a different picture of a hand in the second configuration without causing some intermediate frames to not have a large region of skin pixels.

In a second exemplary embodiment, in which the process is optionally added to the first exemplary embodiment, a geometric model, appearance model, or combination geometric and appearance model can be fitted to the image data corresponding to the hand using methods known in the art, and the quality of the fit, for example measured by the residual sum of least squared fitting errors, can be used as the value of the similarity of the current hand biometric to stored hand biometrics. If the value is within a threshold, the identity of the person whose hand is being scanned is verified or a subset of persons in the database with similar biometric measurements are reported. The change in the fitted model across frames can be used to make the determination that the hand is real. In some embodiments, no threshold is predetermined and the value itself is used as part of a larger system. For some cases, this value can be normalized, using techniques known to those of ordinary skill in the art. Additional protection against spoofing can be obtained by verifying that a sufficiently large region of skin pixels exists in every frame. If the frames are sufficiently close together in time, as in e.g., typical video frame rates of 15 or 30 frames per second, then it is difficult for an unauthorized person to show a picture of a hand in the first configuration and then substitute a different picture of a hand in the second configuration without causing some intermediate frames to not have a large region of skin pixels. Even more protection against spoofing can be obtained by requiring that each frame contain a region of skin pixels that has the shape of the projection of a plausible three-dimensional configuration of a hand. The determination of whether a region of skin pixels has the shape of the projection of a plausible three-dimensional configuration of a hand can be performed using methods known in the art. For example, a deformable template matching technique can be used to measure the similarity between the region of skin pixels and each of a library of stored images of hand regions corresponding to projections of plausible poses, and determining whether the similarity exceeds a specified threshold for at least one of the stored images.

Referring to FIG. 1 and in accordance with a third exemplary embodiment, two cameras (not shown) substantially simultaneously record first and second images, respectively, of the hand 10. The first and second images are binarized as a three dimensional image using stereo vision methods known in the art, and image correaction may be performed. Assignments are made, for example, for three dimensional reference points 30 and 31 at the sides of the palm, reference point 33 at the line crossing between the palm and the arm, and at the reference points 34, 35, 36, 37 on various major lines formed in the palm. It is appreciated that fewer points, or many more points, may be assigned. Distances between selected points are measured. For example, the distance across the palm from the point 31 to the point 32, and/or between two lines at point 35 and 36 or points 34 and 35, are determined. Distances between a plurality of points are preferably determined. Combinations of distances, such as ratios or logical comparisons, may be also be determined. These distances, combinations, or both are then compared with stored distances, combinations, or both from previously stored images. Values are assigned based on the comparison, and a determination is made whether the values are within a threshold. If the values are within a threshold, the identity of the person whose hand is being scanned is verified or a subset of persons in the database with similar biometric measurements are reported. The three dimensionality of the hand is used to make the determination that the hand is real.

In yet a fourth exemplary embodiment, in which the process is optionally added to the third exemplary embodiment, the hand is then reconfigured, such as clenching the hand 40 into a fist (FIG. 2) or rotating the hand 50 upon its side (FIG. 3). Rotating on its side means rotation of the hand, e.g., where the little finger remains in the original plane and the thumb is moved out of the plane as the hand stays flat. One or more three dimensional images are made of the hand being reconfigured and a determination is made that the hand is real. For example, in the case in which pixels or voxels code color values, the three dimensional shape of the set of skin pixels or voxels may be measured in each frame using methods known in the art, and the presence of a deformation of this set across frames is used to determine that the hand is real.

In a fifth exemplary embodiment, a three dimensional geometric model, appearance model, or combination geometric and appearance model can be fitted to the three dimensional image data corresponding to the hand using methods known in the art, and the quality of the fit, for example measured by the residual sum of least squared fitting errors, can be used as the value of the similarity of the current hand biometric to stored hand biometrics. If the value is within a threshold, the identity of the person whose hand is being scanned is verified or a subset of persons in the database with similar biometric measurements is reported. The three dimensionality of the hand is used to make the determination that the hand is real. For example, if a photograph of a hand is presented to the system instead of a real hand, the three dimensional data from the stereo vision processing will determine that the object is planar (a piece of paper) with skin colors printed on it; whereas if a real hand is presented to the system, the three dimensional data from the stereo vision processing will determine that the object has depth as well as width and height.

Alternatively or in addition, the change in the fitted model across frames can be used to make the determination that the hand is real. Additional protection against spoofing can be obtained by requiring that each frame contain a skin-colored surface that has the shape of part of a plausible three-dimensional configuration of a hand. The determination of whether a skin-colored surface has the shape of part of a plausible three-dimensional configuration of a hand can be performed using methods known in the art. For example, a deformable template matching technique can be used to measure the similarity between the skin-colored surface and each of a library of stored three-dimensional surface data models of hands in various plausible poses. If the similarity exceeds a specified threshold for at least one of the stored three-dimensional surface data models it is determined that the skin-colored surface has the shape of part of a plausible three-dimensional configuration of a hand in that frame.

Figure 4:
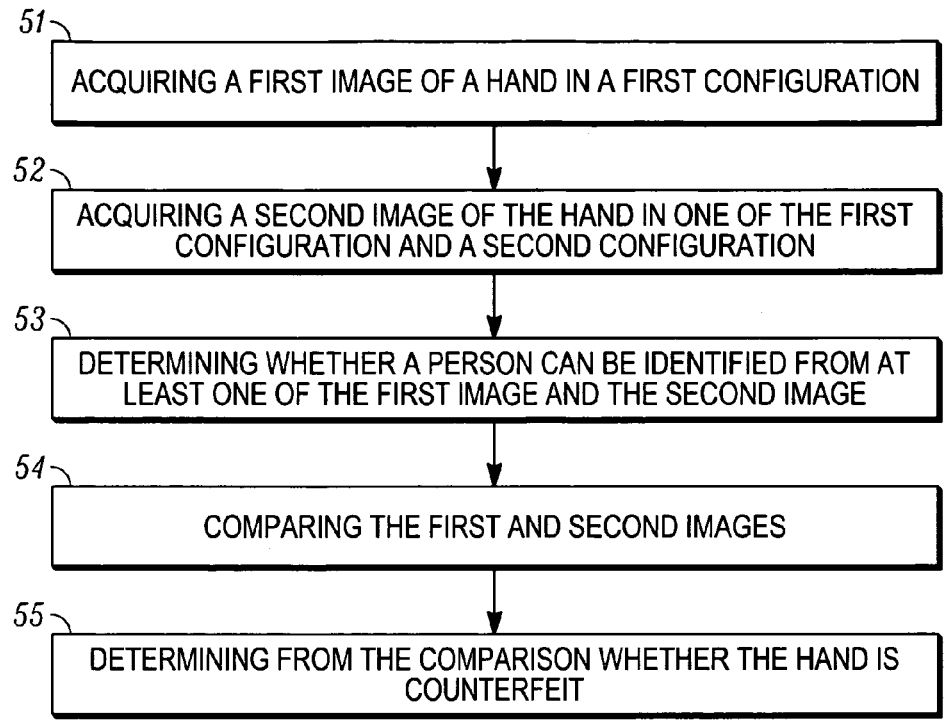
FIG. 4 is a flow chart of an exemplary embodiment.

Referring to FIG. 4, a flow chart includes the steps for exemplary embodiments of verifying the identify of a person, comprising acquiring 51 a first image of a hand in a first configuration, acquiring 52 a second image of the hand in one of the first configuration and a second configuration, determining 53 whether a person can be identified from at least one of the first image and the second image, comparing 54 the first and second images, determining 55 from the comparison whether the hand is counterfeit.

Figure 5:
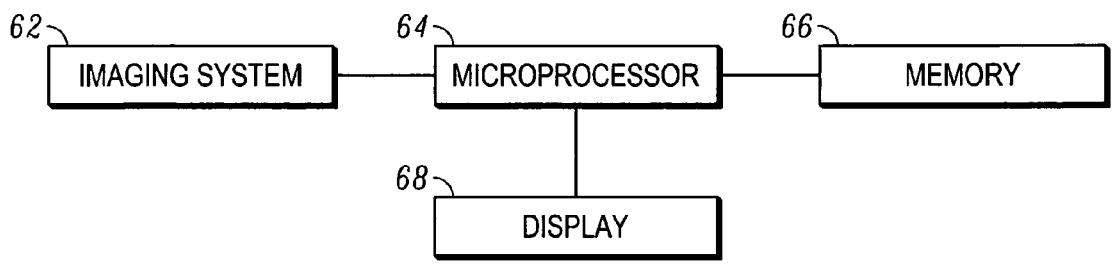
FIG. 5 is a block diagram of a system for implementing exemplary embodiments.

The block diagram of FIG. 5 illustrates an exemplary system for performing the exemplary embodiments described herein. The imaging system 62 records the image of the hand and forwards image data to the microprocessor 64 which computes additional biometric characteristics from the image. The memory 66 provides stored characteristics to the microprocessor 64 for comparison with the recorded image. An output may be provided to a display 68, for example, for indicating whether the recorded biometric matches the stored biometric.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. A method for identifying a person:
   acquiring a plurality of images of a hand with a plurality of cameras, wherein the acquiring a plurality of images comprises acquiring with a first camera a first image of the hand in a first configuration and acquiring at least a second image of the hand in the first configuration with at least a second camera;
   identifying a person from one of the plurality of images by a processor; and
   determining whether the hand is a counterfeit from a comparison of the plurality of images by the processor, wherein the determining step comprises determining whether the hand embodies three dimensions.

2. The method of claim 1 wherein the acquiring a plurality of images comprises acquiring with a camera a first image of the hand in a first configuration and acquiring at least a second image with the camera as the hand is moved from the first configuration.

3. The method of claim 2 wherein the plurality of configurations comprises a flat hand and the hand in at least one configuration other than the flat hand.

4. The method of claim 1 wherein the identifying step comprises:
identifying points on the hand;
measuring distances between the points; and
comparing those distances with stored distances.

5. The method of claim 1 wherein the identifying step comprises measuring physical dimensions.

6. The method of claim 1 wherein the identifying step comprises measuring at least one of a ratio between one of finger length and width, a pattern of lines on the palm, textures, colors, and a combination thereof.

7. The method of claim 1 wherein the determining step comprises:
generating a three dimensional image from the first camera and the at least a second camera; and
fitting one of a three dimensional geometric model, an appearance model, or a combination of a geometric model and appearance model to the three dimensional image.

8. The method of claim 1 wherein the identifying step further comprises determining a normalized confidence level from the first image.

9. A method of a system including a processor, a first camera and at least one second camera for identifying a person, the method comprising:
acquiring, with the first camera, a first image of a hand in a first configuration;
acquiring, with the at least one second camera, at least one second image of the hand in the first configuration;
identifying, by the processor, a person from at least one of the first image or the at least one second image; and
determining, by the processor, whether the hand is a counterfeit from a comparison of the first image and the at least one second image.

10. A system for identifying a person comprising:
a first camera effective to acquire a first image of a hand in a first configuration;
at least one second camera effective to acquire at least one second image of the hand in the first configuration; and
a processor coupled to the first camera and the at least one second camera, wherein the processor identifies a person from at least one of the first image or the at least one second image and determines whether the hand is a counterfeit from a comparison of the first image and the at least one second image.

11. The method of claim 1, wherein acquiring a plurality of images comprises recording an image of the hand and then another image as the hand position is reconfigured.

* * * * *